G. BRADLEY.
Traction-Wheel.
No. 16,044.
Patented Nov. 11, 1856.
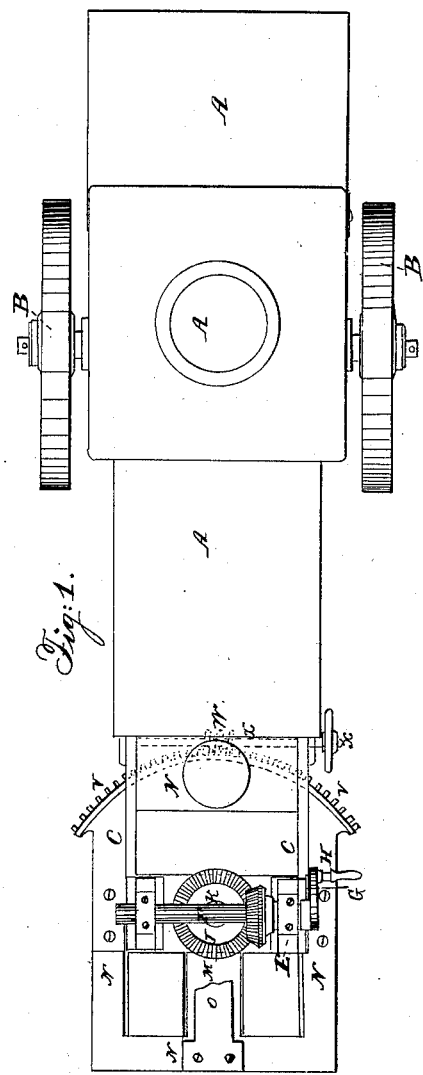
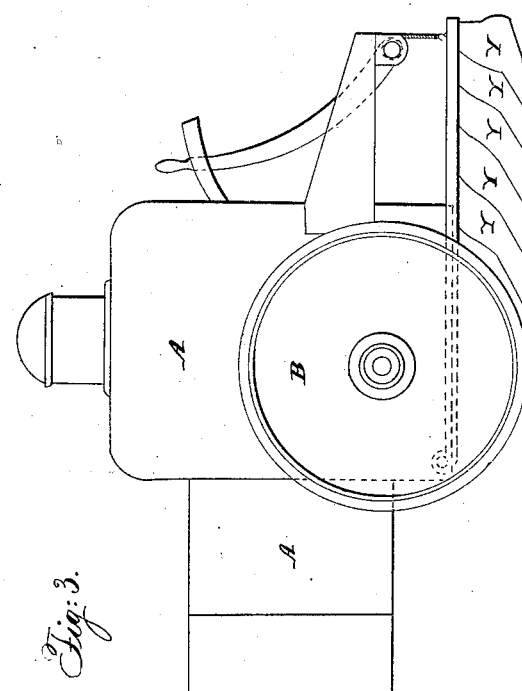
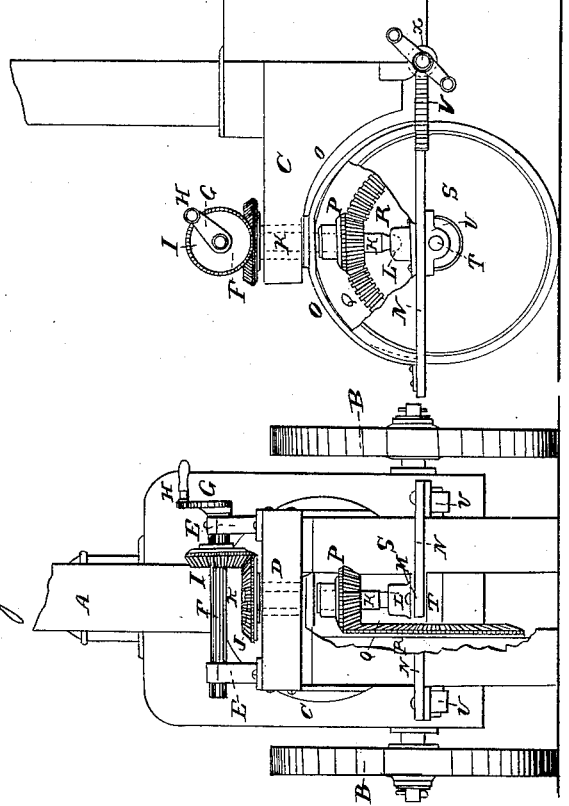

UNITED STATES PATENT OFFICE.

GEORGE BRADLEY, OF PATERSON, NEW JERSEY.

STEAM-DRAY.

Specification of Letters Patent No. 16,044, dated November 11, 1856.

*To all whom it may concern:*

Be it known that I, GEORGE BRADLEY, of Paterson, in the county of Passaic and State of New Jersey, have invented certain new and useful Improvements in Steam-Carriages; and I do hereby declare the following to be a full, clear, and exact description of the same, reference being had to the accompanying drawings, making a part thereof, in which—

Figure 1, represents a top plan. Fig. 2 represents a front elevation, and Fig. 3, represents a side elevation.

Similar letters of reference, where they occur in the separate figures, denote like parts of the carriage in all.

The nature of my invention relates to the placing of the driving wheels of a land steam carriage in a truck in front of the engine frame, when said truck has an independent horizontal movement for the purpose of guiding or controlling the engine frame that follows it, and when so arranged as that the power of the engine can be transmitted to this horizontally moving truck, without racking, cramping or straining, the connecting rods, frames or any other of the parts which necessarily connect the truck, and engine frames, together.

To enable others skilled in the art to make and use my invention, I will proceed to describe the same with reference to the drawings which represent so much of the carriage as will illustrate the novel features of the invention.

A, represents the outline of an ordinary locomotive such as are used on railroads. B, are the wheels thereof, but instead of being driving wheels, as in a locomotive, they are but supporting or carrying wheels, and turn on instead of with their axle. To the front part of the engine frame, is attached—one on each side—two brackets C, C, of iron, which support a transverse plate D, and upon said plate is mounted, two pillow blocks E E, for forming suitable bearings for a shaft F, that turns in them. Upon one (or both) of the ends of the shaft F, may be placed the crank G, and wrist pin H, to which the connecting rods of the engine may be attached in the usual manner. There is also upon the shaft F, a bevel spur gear I, which takes into and turns a bevel wheel J, arranged on a vertical shaft K, that passes through, and is supported in the transverse plate D, by suitable collars or flanges thereon. The lower end of the shaft K, has a step or bearing in the box L, which is supported on the center piece M, of the truck frame N. The truck frame is substantially built of iron and has an arch piece O, at its central part—curving upward and extending from the front to the rear of said truck frame. The transverse plate D, rests upon this arch piece O, in such manner that it can freely turn under said plate, as will be presently described. On the shaft K, below the arch piece O, is fixed a bevel pinion P, which takes into a bevel rack or gear Q, on the side of one of the driving wheels R to give them motion—the driving wheel R, as well as its fellow S, being fast upon an axle T, which is suitably supported in boxes U, fastened to the truck frame. The center of the shaft K, is the axis of motion of the truck frame, and the power from the engine is conveyed to the driving wheels directly through this same shaft K, and when the truck with its driving wheels is turned, so as to direct the engine frame that follows it—the bevel gearing simply rolls on each other to compensate for this turning, and the plate D, with all the parts connected to it, preserve the same relative position to the engine and its frame, so that there is no cramping whatever may be the position of the truck frame and drivers in it.

It will be perceived that, as compared with a locomotive, or an ordinary steam carriage for common roads I reverse the whole general arrangement viz: putting the driving wheels in the front truck—allowing said wheels to turn to the right or left horizontally at pleasure, and still be in gear with the engine;—causing the truck to draw and control the engine frame which follows it;—placing the supporting wheels behind, where the drivers generally are placed. But this is not simply a reversion of parts without effect. On the contrary by this construction the steam carriage can turn in any direction with the greatest facility—a thing so impossible with former steam land carriages as to make them impracticable.

On the rear of the truck frame is a circular rack V, into which a worm gear W, on a shaft X, takes, so that the turning of said shaft by hand, or by the power of the engine, will cause the truck frame to turn in the direction in which the carriage is to be moved and thus the carriage follows the driving wheels, instead of making the driving wheels direct the carriage. The after part of the truck frame may move between guides or supports connected to the engine frame, so as to have an under as well as an upper support or connection between the truck and engine frames—for although they may move independent of each other, yet they should be so connected as to make the rear portion follow, or track the truck frame as above set forth. When the driving wheels are placed behind, on the engine frame, they must of course be fast to the axle—then skew the truck frame in front, and it will be seen at once that the rear part, does not incline to follow the truck, but the tendency is to push the truck in its own line.

Y, Y, represent a series of plows attached to my carriage, it may be used for this or any other purpose.

Having thus fully described the nature of my invention what I claim therein as new, and desire to secure by Letters Patent is—

1. The arranging of the driving wheels of a steam carriage in a truck frame that can turn independent of the engine frame, and so that the engine frame shall follow or be drawn by the truck frame, instead of the latter being controlled by the former, as has heretofore been done.

2. I also claim transmitting the power of the engine, to the driving wheels in the truck frame so arranged, through the swiveling point or axis of the truck frame, so that there shall be no cramping or twisting of the frames, or connecting rods, substantially as herein set forth.

GEORGE BRADLEY.

Witnesses:
THOMAS H. UPPERMAN,
E. COHEN.